FREQUENCY MULTIPLIER

Filed Aug. 17, 1959

ROBERT B. MUCHMORE
*INVENTOR*

BY Jerry A. Dinardo
*AGENT*
Albert Rosen
*ATTORNEY*

United States Patent Office 3,025,448
Patented Mar. 13, 1962

3,025,448
FREQUENCY MULTIPLIER

Robert B. Muchmore, Pacific Palisades, Calif., assignor to Space Technology Laboratories, Inc., a corporation of Delaware Filed Aug. 17, 1959, Ser. No. 834,195
6 Claims. (Cl. 321—69)

This invention relates to frequency multipliers, and more particularly to novel and improved means for simultaneously generating and amplifying any desired one of a number of high harmonics of a given electrical signal.

Known frequency multipliers conventionally take the form of vacuum tube or related types of circuits and are usually inherently low in efficiency and generally require one or more separate stages of amplification to raise the power of the desired harmonic signal to a useful level. Furthermore, noise becomes a more serious problem with increasing microwave frequencies due to the inherent difficulty of making noise-free vacuum tubes usable at such high frequencies. Then, too, with such high frequency tube circuits the resulting equipment requirements may become relatively complex and bulky. Consequently, such conventional frequency multiplier arrangements have not proven entirely satisfactory.

Accordingly, it is an object of this invention to provide an improved frequency multiplier system which is characterized by its relative simplicity and low bulk, and freedom from noise.

The foregoing and other objects are realized in accordance with this invention through the use of a novel circuit arrangement that makes use of a parametric amplifier arrangement to generate and amplify any desired one of a number of high harmonics of a signal at a given fundamental frequency. (A parametric amplifier is one where two or more signals are mixed by a nonlinear reactance to produce amplification. One of the signals is usually the input signal to be operated upon, and the second signal, known as the reactance changing or pumping signal, is usually another applied signal that provides the power used in the amplification process.) In one embodiment the nonlinear reactance is connected to play a dual role. Firstly, this reactance is used to generate harmonics of an input signal at a given fundamental frequency, one of the harmonics being the desired harmonic signal. Secondly, the nonlinear reactance serves as the mixing or coupling element wherein the desired harmonic signal and the pumping signal are combined to produce amplification of this desired harmonic signal.

In this embodiment a nonlinear reactance is connected in a resonant system that is tuned to a number of predetermined frequencies. These different frequencies consist substantially only of the fundamental input frequency, the desired harmonic frequency, a pumping signal frequency that is higher than the harmonic frequency, and an idling signal frequency equal to the difference between the pumping signal frequency and the harmonic frequency.

In operation, the input, fundamental frequency signal and the pumping signal are applied to the nonlinear reactance. The flow of current through the nonlinear reactance at the fundamental signal frequency generates harmonics of the fundamental frequency. Among all of the harmonics that are generated, only the desired harmonic is selected by the resonant system. The mixing of the harmonic signal with the pumping signal generates current at the idling signal frequency (the frequency equal to the difference between the harmonic and pumping signal frequencies). The interaction of these three signals (the harmonic signal, the pumping signal, and the idling signal) in the resonant system gives rise to an enhancement in the power at the frequency of the harmonic signal. Thus, frequency multiplication, and enhancement of the multiplied signal, are obtained in a single system.

Figure 1:
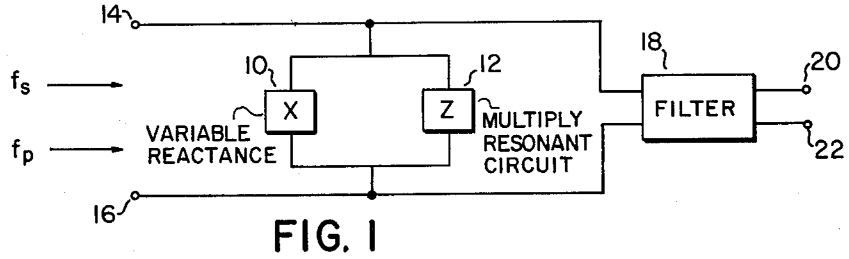
FIG. 1 is a block diagram illustrating one form of frequency multiplier in accordance with the invention.

Referring to FIG. 1, a generalized diagram is shown of one form of a frequency multiplier according to the invention. As has been indicated above, the multiplier makes use of parametric amplifier principles. A discussion and review of parametric amplifiers is contained in an article entitled "Solid-State Microwave Amplifiers," by Hubert Heffner, IRE Transactions on Microwave Theory and Techniques, January 1958.

A nonlinear, variable reactance 10 (FIG. 1) and a multiply resonant circuit 12 are shown connected across a pair of input terminals 14 and 16. The nonlinear, variable reactance, as is known, may for example take the form of a nonlinear capacitor such as a semiconductor diode, or of a nonlinear inductor such as a ferrite. The multiply resonant circuit 12 is parallel resonant at a number of specified frequencies, as will be more fully described. A filter network 18, sharply tuned so as to pass only one of these specified frequencies, is connected in tandem with the parallel connected nonlinear, variable reactance 10 and circuit 12. The desired output signal is taken from the filter network 18 through a pair of output terminals 20 and 22.

Figure 2:
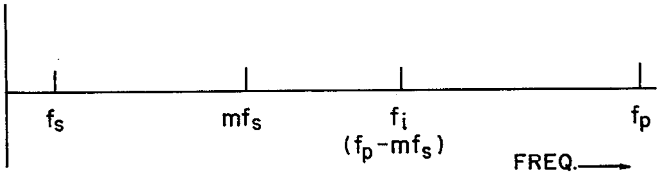
FIG. 2 is a graph showing the relative positions, in the frequency spectrum, of signals used in the embodiment of FIG. 1.

An input signal of a given fundamental frequency $f_s$, which is to be multiplied by some factor $m$ (an integer greater than 1), is applied to the input terminals 14 and 16. In addition, a reactance changing or pumping signal of frequency $f_p$ is also applied to the input terminals 14 and 16. The pumping signal $f_p$ is at a substantially higher frequency than that of the fundamental frequency $f_s$, and is also higher than the desired harmonic frequency $mf_s$. The relation between the frequencies is shown in the graph of FIG. 2.

It is well known that a nonlinear reactance is a generator of harmonics. Accordingly, the application of the input signal $f_s$ to the nonlinear, variable reactance 10 will result in the generation of a number of harmonics, among them the one at the desired harmonic frequency $mf_s$. By means of appropriate well known resonant elements in the multiply resonant circuit 12, the circuit is tuned to the desired harmonic $mf_s$, thereby suppressing all of the other harmonics. The circuit 12, in addition to accepting the desired harmonic frequency $mf_s$, is constructed to be resonant at substantially only three other frequencies. These three other frequencies include the fundamental frequency $f_s$, the pumping frequency $f_p$, and an idling frequency $f_i$ equal to the difference $(f_p - mf_s)$ between the pumping frequency $f_p$ and the harmonic frequency $mf_s$. The signal at the idling frequency $f_i$ is produced by the mixing of the harmonic and pumping signals in the variable reactance 10.

Figure 3:
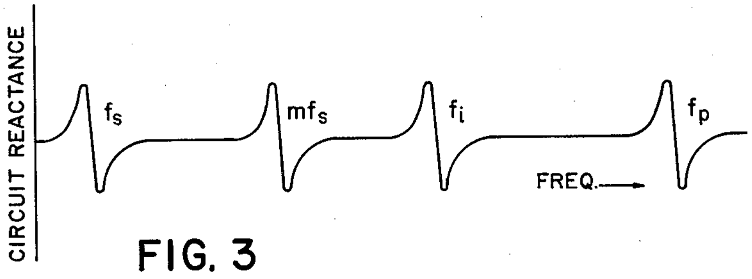
FIG. 3 is a graph showing the frequency response characteristics of a multiply resonant circuit forming a part of the embodiment of FIG. 1.

The frequency response characteristics of the resonant circuit 12 are shown in the graph of FIG. 3. As shown, resonance occurs at the four frequencies $f_s$, $mf_s$, $f_i$, and $f_p$, where the reactance of the circuit 12 becomes zero. For simplicity, the reactance variations are shown as being identical in these frequency regions, but they may in fact be different.

By means of the frequency selective characteristics of the multiply resonant circuit 12 (FIG. 1), there will be a combination of currents flowing in the variable reactance 10 which will give rise to an amplification of the desired harmonic frequency signal above its original power level. The combination of currents that satisfies the conditions for amplification of the harmonic frequency signal of frequency $mf_s$ consists of those currents that flow at the harmonic frequency $mf_s$, the pumping frequency $f_p$, and the idling frequency $f_i$. The process by which amplification takes place may be thought of as involving the introduction of a negative resistance across the input terminals 14 and 16 (FIG. 1) at the harmonic frequency $mf_s$.

The amplified output may be taken across the output terminals 20 and 22 after passing through the bandpass filter 18. The filter 18 is sharply tuned to the desired harmonic frequency $mf_s$ so as to attenuate the fundamental, pumping, and idling frequencies; accordingly, the output voltage taken across the output terminals 20 and 22 is substantially at the harmonic frequency $mf_s$.

Figure 4:
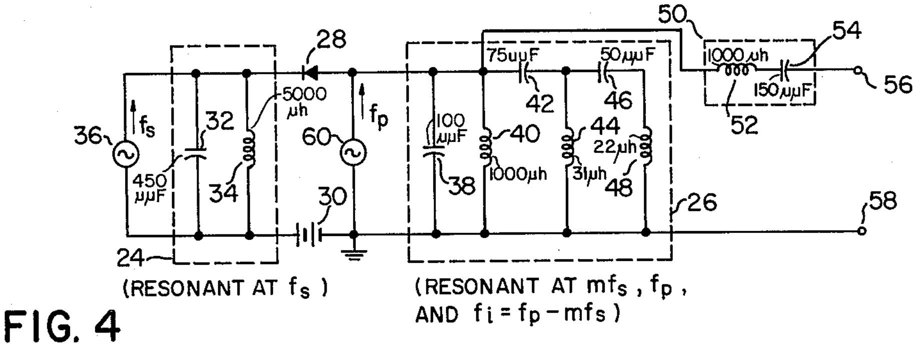
FIG. 4 is a schematic diagram of another form of frequency multiplier circuit according to the invention.

FIG. 4 shows a schematic diagram of another form of frequency multiplier circuit arrangement which can be used to carry out the principles of the invention.

A first resonant circuit 24 and a second resonant circuit 26 are coupled together by a nonlinear, variable reactance 28 in the form of a semiconductor diode. The semiconductor diode 28, which may for example be a diode of the type generally designated vari-cap diode V–56 made by the Pacific Semiconductors Inc. of Culver City, California, is biased in its reverse direction by means of a direct current source 30. In this example, with the diode described, the bias should be at about —4 volts. The diode 28 is connected between the two resonant circuits 24 and 26. When so biased, the diode 28 constitutes a nonlinear, variable capacitor, one whose capacitance varies nonlinearly with the voltage impressed across it. The first resonant circuit 24 includes a capacitor 32 and an inductor 34 connected in parallel. This first resonant circuit 24 is tuned to the input frequency $f_s$, the frequency of the signal to be multiplied. The input or fundamental signal $f_s$ is generated by an alternating current source 36 connected to the first resonant circuit 24.

The second resonant circuit 26 is multiply resonant at substantially only three predetermined frequencies, namely, the desired harmonic frequency $mf_s$, the pumping frequency $f_p$, and the idling frequency $f_i$. This second resonant circuit 26 includes a first capacitor 38 and a first inductor 40 connected in parallel, a second capacitor 42 and second inductor 44 connected in series across the parallel connected first capacitor 38 and first inductor 40, and a third capacitor 46 and third inductor 48 connected in series across the second inductor 44.

By proper selection of the inductance and capacitance values in the multiply resonant circuit 26, each of the three circuit loops can be designed to resonate at a different one of the three predetermined frequencies. For example, the first circuit loop comprising the first capacitor 38 and first inductor 40 may be made resonant at the harmonic frequency $mf_s$; the second circuit loop comprising the first and second inductors 40 and 44 and the second capacitor 42 may be made resonant at the pumping frequency $f_p$; and the third circuit loop comprising the second and third inductors 44 and 48 and third capacitor 46 may be made resonant at the idling frequency $f_i$. The capacitance of the variable reactance diode 28 contributes to all of the parameters of the resonant circuits in the system, but contributes primarily to only the first resonant circuit 24 (made up of the capacitor 32 and inductor 34) and the resonant loop comprising capacitor 38 and first inductor 40.

A sharply tuned filter 50, which includes an inductor 52 and a capacitor 54, is connected to one side of the first circuit loop (made up of the first capacitor 38 and first inductor 40) that is resonant at the desired harmonic frequency. The amplified harmonic signal output is taken across a pair of output terminals 56 and 58, these terminals being connected across the first circuit loop (capacitor 38 and inductor 40) through the filter 50. An alternating current source 60, which generates a signal at the pumping frequency of $f_p$, is connected to the variable reactance semiconductor diode 28 across the second resonant circuit 26 so as to modulate the reactance of the diode 28 in accordance with the pumping frequency $f_p$.

The mixing of the fundamental and pumping signals (at frequencies $f_s$ and $f_p$, respectively) in the diode 28 (the nonlinear, variable capacitor) causes flow of current in the diode 28 at the desired harmonic frequency $mf_s$, the pumping frequency $f_p$, and the idling frequency $f_i$. As a result, there is produced in the second resonant circuit 26 a signal at the harmonic frequency $mf_s$ which is greatly amplified in power. The harmonic frequency signal is separated from the remainder of the signals developed in the second resonant circuit 26 by means of the bandpass filter 50 which is sharply tuned to pass substantially only the harmonic frequency signal. The harmonic frequency signal is then taken across the output terminals 56 and 58.

In the foregoing discussion lumped capacitive and inductive elements have been shown for purpose of illustration. However, it is understood that the practice of the invention can be carried out through the use of distributed elements, such as with the use of a microwave resonant cavity.

In the table below there are listed values of circuit elements which may be used in a frequency multiplier according to the invention. In the example given, the values listed are applicable to a fundamental frequency $f_s$ of 100 kilocycles per second, a harmonic frequency $mf_s$ of 400 kilocycles per second, a pumping frequency $f_p$ of 4 megacycles per second, and an image frequency $f_i$ of 3.6 megacycles per second.

| Inductor (FIG. 4) | Inductance (microhenries) |
|---|---|
| 34 | 5000 |
| 40 | 1000 |
| 44 | 31 |
| 48 | 22 |
| 52 | 1000 |

| Capacitor (FIG. 4) | Capacitance (micromicrofarads) |
|---|---|
| 32 | 450 |
| 38 | 100 |
| 42 | 75 |
| 46 | 50 |
| 54 | 150 |

From the foregoing it is realized that the invention provides improved simplified apparatus that will simultaneously generate and amplify any one of a number of high harmonics of a given signal.

What is claimed is:

1. In a frequency multiplier system of the type wherein an input alternating current signal of a fundamental frequency is multiplied to a predetermined harmonic of said fundamental frequency, the combination comprising: a nonlinear reactance element; multiply resonant circuit means electrically coupled to said element; signal input means connected to said nonlinear reactance element to feed thereto both said input signal and a pumping signal having a frequency greater than the predetermined harmonic of said fundamental frequency; said multiply resonant circuit means being resonant substantially only at frequencies equal to those of said fundamental frequency, said predetermined harmonic frequency, said pumping signal frequency, and a frequency equal to the difference between said pumping and harmonic frequencies; and means coupled to said multiply resonant circuit means to extract energy substantially only at said harmonic frequency.

2. The combination claimed in claim 1, wherein said nonlinear reactance element is connected in parallel with said multiply resonant circuit means.

3. The combination claimed in claim 1, wherein said nonlinear reactance element comprises a device whose capacitance varies nonlinearly with voltage impressed thereacross.

4. The combination claimed in claim 3, wherein the nonlinear capacitance device comprises a semiconductor diode, and wherein said combination further includes means connected to bias said diode in its reverse direction.

5. In a frequency multiplier system of the type wherein an input signal of a fundamental frequency is multiplied to a predetermined harmonic thereof, the combination comprising: a first resonant circuit means; a second resonant circuit means; a nonlinear reactance element coupling said resonant circuit means together; signal input means connected to said nonlinear reactance element and adapted to feed thereto both said input signal and a pumping signal having a frequency greater than the desired harmonic of said fundamental frequency; the resonant frequency of said first resonant circuit means being substantially equal to said fundamental frequency; and said second resonant circuit means being resonant substantially only at frequencies equal to those of said harmonic frequency, the frequency of said pumping signal, and a frequency equal to the difference between said pumping frequency and said harmonic frequency; and filter means connected to said second resonant circuit to pass substantially only signals at said harmonic frequency.

6. Frequency multiplier apparatus of the type wherein a fundamental frequency is multiplied to a predetermined harmonic thereof, comprising in combination: a first parallel resonant circuit means having a resonant frequency equal to said fundamental frequency; a first source of current at said fundamental frequency coupled to said first resonant circuit means; a second resonant circuit means; a nonlinear reactance element connected to couple said first and second resonant circuits together; a second source of current at a frequency higher than said predetermined harmonic frequency coupled to said nonlinear reactance element; said second resonant circuit means having at least three circuit loops each resonant at a different one of three frequencies including said harmonic frequency, said second source frequency, and a frequency substantially equal to the difference between said harmonic and second source frequencies; and filter means coupled to the circuit loop resonant at said harmonic frequency, to pass substantially only signals at said harmonic frequency.

References Cited in the file of this patent

UNITED STATES PATENTS

| | | |
|---|---|---|
| 2,013,806 | Osnos | Sept. 10, 1935 |
| 2,565,497 | Harling | Aug. 28, 1951 |
| 2,760,160 | Flood et al. | Aug. 21, 1956 |
| 2,838,687 | Clary | June 10, 1958 |
| 2,894,214 | Touraton | July 7, 1959 |

FOREIGN PATENTS

| | | |
|---|---|---|
| 1,073,557 | Germany | Jan. 21, 1960 |